United States Patent Office 3,528,031
Patented Sept. 8, 1970

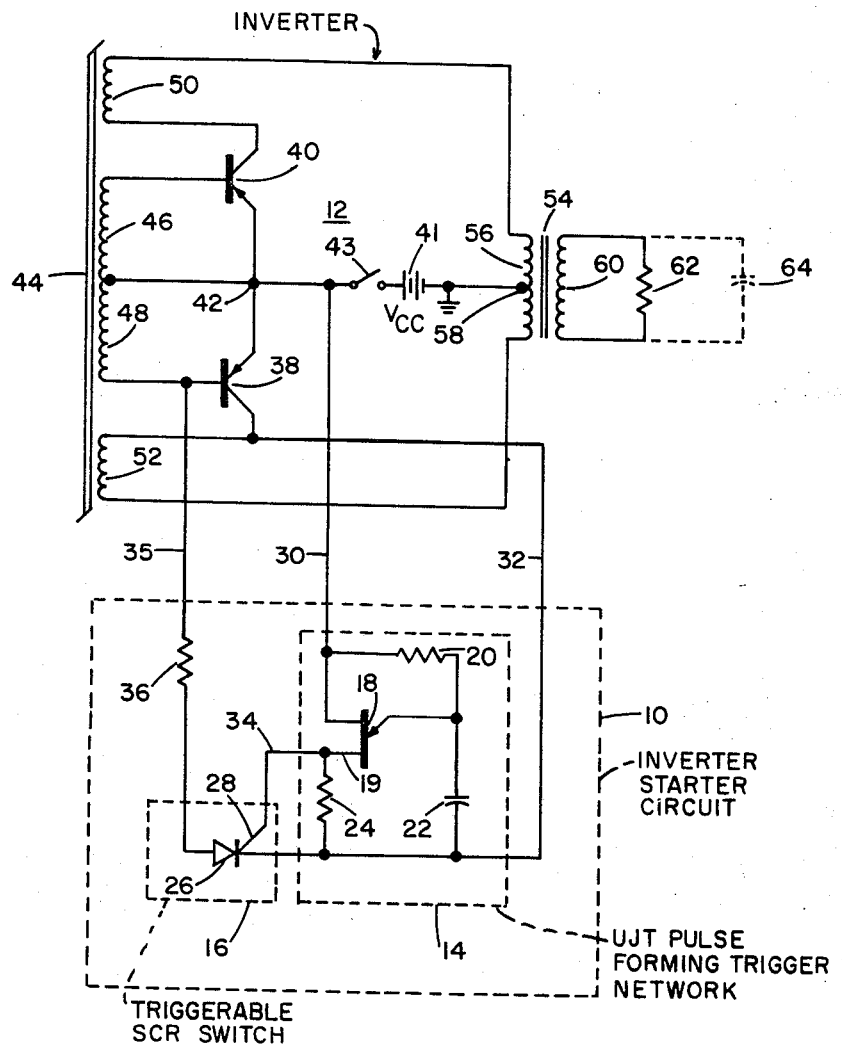

3,528,031
STARTING CIRCUIT FOR TRANSISTOR INVERTERS, BLOCKING OSCILLATORS, AND THE LIKE
Lawrence Merrill Palmer, Arcadia, Calif., and Robert A. Phillips, Scottsdale, Ariz., assignors to Motorola, Inc., Franklin Park, Ill., a corporation of Illinois
Filed Feb. 1, 1968, Ser. No. 702,230
Int. Cl. H02m 7/52
U.S. Cl. 331—113
2 Claims

ABSTRACT OF THE DISCLOSURE

Disclosed is a starting circuit for a transistor inverter, blocking oscillator or the like and includes a starting oscillator or pulse-type trigger circuit having a period of oscillation substantially greater than the period of oscillation of the inverter. A triggerable switch is connected between the starting oscillator and the inverter and is triggered into conduction by the starting oscillator when the latter conducts, thereby producing a starting current in the inverter. Circuit means are connected between the starting circuit and the inverter and prevent the starting oscillator from charging up to a firing voltage within a half period of oscillation of the inverter.

BACKGROUND OF THE INVENTION

This invention relates generally to starting circuits for transistor inverters and the like and more particularly to a oscillator-type pulse forming starting circuit which consumes very little power.

Various types of circuits have been used for starting transistor inverters to insure positive starting when an energizing potential is applied to the inverter. For example, in a two transistor current or voltage feedback inverter, it is frequently desirable to start the inverter by driving a particular one of the two transistors into conduction every time the inverter is energized. These prior art starting circuits for transistor inverters include passive resistance-capacitance networks adapted to be connected between one of the transistors of the inverter and a supply voltage and which are responsive to an energizing potential to drive a selected one of the transistors into conduction.

A significant disadvantage of this type of prior art starting circuit resides in the fact that these passive networks remain connected to the supply voltage after starting occurs and consequently they consume power after the starting function has been completed. Additionally, known prior art starting circuits have been unreliable in starting transistor inverters which drive large capacitive loads.

SUMMARY OF THE INVENTION

An object of this invention is to provide a new and improved starting circuit for a two-transistor inverter or the like.

Another object of this invention is to provide a starting circuit which is effectively disconnected from the inverter after the inverter has been started.

Another object of this invention is to provide a starting circuit of the type described which is capable of rapidly starting the inverter when the latter is connected to drive highly capacitive loads.

The present invention features a pulse type starting circuit which may be constructed with relatively inexpensive unijunction transistors and semiconductor controlled rectifiers in a relaxation-type oscillator circuit. A unijunction transistor (UJT) is connected to trigger a semiconductor controlled rectifier (SCR) to thereby produce a starting signal for a transistor inverter.

These and other objects and features will become more fully understood in the following description of the accompanying drawing in which a single embodiment of the invention is illustrated.

DESCRIPTION OF THE INVENTION

Briefly described, this invention comprises a relaxation type oscillator starting circuit including UJT, pulse-forming trigger network which is connected to trigger an SCR into conduction when the trigger network is energized. The SCR is connected to a selected one of two transistors in a transistor inverter circuit and supplies the necessary base drive to saturate this selected transistor when the inverter is started. After the inverter is started, the UJT (in the trigger network) cannot fire the SCR again due to the relatively long time constant of the resistance-capacitance circuitry in the pulse forming trigger network.

Referring to the drawing in more detail, there is shown a relaxation-type starting circuit 10 including a monostable unijunction transistor pulse forming trigger network 14 and a triggerable semiconductor controlled rectifier (SCR) 16. The UJT 18 is connected via line 30 to a supply voltage 41 for a two transistor inverter 12. Other connecting lines or "connections" between the inverter 12 and starting circuit 10 include connections 32 and 35. The SCR 16 has its anode 26 connected via resistor 36 to the base of a selected transistor 38 in the two transistor inverters.

The PNP common emitter-type inverter 12 is a current feedback inverter and the operation thereof is well known. Transistors 38 and 40 are connected respectively at the bases thereof to windings 48 and 46 on a saturable core 44 which exhibits a rectangular hysteresis characteristic. The emitters of transistors 38 and 40 are connected to a center tap 42 between windings 46 and 48, and the collectors of transistors 38 and 40 are connected to current feedback windings 52 and 50 as shown.

An output winding 56 has the opposite ends thereof connected to the feedback windings 52 and 50, and is further transformer coupled to an output winding 60 on core 54. The output winding 60 is connected to drive a resistive load 62 which may have a substantial capacitive load 64 connected thereto depending on the particular application for which the inverter is used.

OPERATION

Assume that both transistors 38 and 40 are initially non-conducting and that the inverter is not operating. The supply voltage 41 is disconnected from the circuit with switch 43 open, and the starting circuit 10 is likewise deenergized. Assume now that switch 43 is closed to energize the starting circuit 10. With the positive terminal of the supply voltage 41 connected to the pulse forming UJT network 14, capacitor 22 charges through resistor 20 to a voltage sufficiently high to fire UJT 18. When $V_{C22}/V_{CC}$ exceeds the intrinsic standoff ratio of the unijunction transistor 18 (where $V_{C22}$ is the voltage across capacitor 22 and $V_{CC}$ is the voltage at supply 41) UJT 18 fires and discharges capacitor 22 into the gate 28 of the SCR 16. Normally the UJT 18 will fire once, trigger the SCR 16 and then turn off. However, the UJT may continue to fire until the inverter starts if for some reason starting does not occur on the first pulse. This condition might arise where there is successive charging of load capacitance. Base drive for transistor now flows through the resistor 36 into anode 26 of SCR 16 until transistor 38 is turned on. The inverter is now operating. Regenerative coupling between windings 48 and 52 will cause transistor 38 to saturate and drive the base of transistor 38 negative with respect to its collector. This action reverse biases the SCR 16, causing it to commutate off. With transistor 38 conducting, the core 44 becomes saturated due to the voltage developed across winding 48 and produces a decrease in base drive to transistor 38, causing it to turn off.

At maximum current conduction through transistor 38, transistor 40 is driven further into nonconduction. However, when magnetic saturation is reached in core 44, the base drive to transistor 38 is reduced. A decrease in base current to transistor 38 permits the magnetic field of the core 44 to collapse and thereby induce a base drive voltage in winding 46 at the base of transistor 40. When transistor 40 turns on the regenerative coupling between windings 46 and 50 drives transistor 40 into increased conduction and towards saturation as transistor 38 is rapidly turned off. When transistor 40 reaches full conduction, the above-described operation is repeated. The transistor inverter shown in the drawing oscillates to provide an alternating output voltage at winding 60 which may be rectified and filtered if an output DC voltage is desired.

When transistor 40 is conducting and the voltage across the unijunction transistor circuit 14 is approximately $2V_{CC}$, the unijunction transistor cannot fire the SCR 16 again due to the relatively long RC time constant of resistance 20 and capacitor 22 with respect to a half period of oscillation of the inverter. During alternate half periods of inverter oscillation, the voltage across the unijunction transistor circuit 14 is the $V_{CE(SAT)}$ of transistor 38, and capacitor 22 discharges toward zero. Thus, after extremely reliable starting is achieved, the starting circuit 10 is effectively decoupled from the transistor inverter 12 and does not detract from the operating efficiency of the latter.

Although the inverter circuit shown in the drawing is a common emitter current feedback inverter using PNP transistors, the starting circuit 10 can be used with both NPN and PNP current and voltage feedback transistor inverters connected in either the common emitter or common collector configurations.

The circuit formed by unijunction transistor 18, resistor 20, capacitor 22 and resistor 24 is a unijunction transistor relaxation oscillator. However, this oscillator is operated in a monostable mode in accordance with the present invention since the RC time constant of resistor 20 and capacitor 22 is long compared to the period of oscillation of the inverter as minimum supply voltage $V_{CC}$. Resistor 24 which is connected to the base 19 of the unijunction transistor 18 prevents overdriving the gate 28 of the SCR 16 and also prevents extraneous noise from accidentally triggering SCR 16. Resistor 36 which is connected to the anode 26 of SCR 16 should be small enough to supply sufficient base drive to transistor 38 and fully saturate the latter during starting, but also large enough to prevent current through SCR 16 from exceeding the surge current rating of the unit.

It is presently practical and economical to construct the invention described above with inexpensive plastic silicon controlled rectifiers and unijunction transistors. The SCR 16 provides excellent base drive for rapidly starting the inverter 12 into highly capacitive loads which may be coupled thereto. Such base drive has not been realized in prior art starting circuits utilizing only passive resistance-capacitance networks.

Values of components used in starter and inverter circuitry of the invention which has been actually built and successfully tested may be found in the following table. However, these values should not be construed as limiting the scope of this invention.

TABLE

| Component: | Value |
|---|---|
| Resistor 20 | 270,000 ohms |
| Resistor 24 | 47 do |
| Resistor 36 | 10 do |
| Capacitor 22 | .1 microfarad |

| | Type |
|---|---|
| Transistor 38 | 2N4398 |
| Transistor 40 | 2N4398 |
| UJT 18 | 2N4870 |
| SCR 16 | 2N4441 |

| | Rating |
|---|---|
| $V_{CC}$ | 13.6 volts, 15 amps. |

It should be understood that the starting circuit of the present invention is not limited to use with an inverter type circuit, but can be used to start various types of oscillatory circuits without departing from the scope of this invention.

We claim:
1. A starting circuit for an inverter or similar circuit, said starting circuit including in combination:
   a starting oscillator comprising a unijunction transistor, said unijunction transistor connected to said inverter and a resistance-capacitance network connected to said unijunction transistor to charge up to a firing voltage and initiate conduction in said starting oscillator a predetermined time after being energized by a supply voltage, said starting oscillator having a period of oscillation greater than the period of oscillation of said inverter,
   a triggerable switch connected between said starting oscillator and said inverter, said triggerable switch comprising a semiconductor controlled rectifier having the gate thereof connected to said unijunction transistor and triggered into conduction by oscillations in said starting oscillator to draw current from said supply voltage and provide a turn-on drive current for said inverter, and means connecting a supply voltage terminal for said inverter to said starting oscillator for driving the latter into conduction to trigger said triggerable switch and thereby start oscillations in said inverter.

2. A starting circuit for an inverter having at least two transistors therein connected to alternately conduct when said inverter is oscillating; said starting circuit having first, second and third input connections and including, in combination:
   a starting oscillator having a period of oscillation much greater than the period of oscillation of said inverter, said first connection adapted to connect said starting oscillator to one side of a supply voltage for said inverter and to receive an energizing potential therefrom sufficient in magnitude to drive said starting oscillator into conduction, said second connection adapted to electrically connect said starting oscillating through said inverter to the other side of said supply voltage, said starting oscillator including a unijunction transistor connected to said supply voltage and further having a resistance-capacitance network connected thereto, said resistance-capacitance network operative to charge up to a firing voltage after being energized by said supply voltage to bias said unijunction transistor into conduction, and
   a semiconductor switch connectable through said third connection to one transistor in said inverter, said semiconductor switch operative to receive a turn-on voltage from said starting oscillator to thereby provide a turn-on drive current in said one transistor in said inverter when said starting oscillator is driven into conduction, said semiconductor switch is a semiconductor controlled rectifier having a gate electrode connected to said starting oscillator and being triggered into conduction when said unijunction transistor is biased into conduction to thereby provide a starting current for said one transistor in said inverter.

References Cited

UNITED STATES PATENTS

| | | | |
|---|---|---|---|
| 3,345,580 | 11/1967 | Tracy | 331—113 |
| 3,037,158 | 5/1962 | Schmidt | 331—111 |
| 3,247,466 | 4/1966 | Mayer | 331—113 |

JOHN KOMINSKI, Primary Examiner

U.S. Cl. X.R.

331—111